United States Patent [19]

Emge

[11] 3,775,862
[45] Dec. 4, 1973

[54] SELF CLEARING CONTAINER PART CONVEYOR SYSTEM

[75] Inventor: Gene F. Emge, Bay City, Mich.

[73] Assignee: Koehring Company, Milwaukee, Wis.

[22] Filed: Oct. 26, 1971

[21] Appl. No.: 192,471

[52] U.S. Cl. .................. 34/105, 34/236, 198/103
[51] Int. Cl. ............................................ F26b 25/00
[58] Field of Search ............... 34/105, 203, 205, 34/208, 236, 217; 198/103

[56] References Cited
UNITED STATES PATENTS

| | | | |
|---|---|---|---|
| 2,796,164 | 6/1957 | Hakogi | 34/105 |
| 2,744,608 | 5/1956 | Ardell et al. | 198/103 |
| 2,910,992 | 11/1959 | Wilcox | 34/105 |
| 3,124,065 | 3/1964 | Bozek et al. | 198/103 |
| 2,923,397 | 2/1960 | Parrish | 198/103 |

*Primary Examiner*—John J. Camby
*Assistant Examiner*—James C. Yeung
*Attorney*—Learman & McCulloch

[57] ABSTRACT

A plastic container part conveyor mechanism for use in conjunction with a printing machine which decorates the annular side walls of container parts. The conveyor mechanism is used to move parts leaving the printing machine past a series of dryers for drying the ink on the container parts prior to moving them to a container assembly machine wherein the parts are friction welded together to form containers. The mechanism includes a pair of oppositely directed conveyor sections, providing an interrupted path of travel, and a generally horizontally disposed rotary disc or turntable having openings communicating with a source of vacuum for lifting the parts off one conveyor section and transferring them to the oter conveyor section. A similar vertically disposed rotatably mounted section disc can be used to supply the container parts to the upstream conveyor section.

4 Claims, 3 Drawing Figures

SELF CLEARING CONTAINER PART CONVEYOR SYSTEM

BACKGROUND OF THE INVENTION

In the past, a continuous conveyor has been used to transport printed container parts from the printing machine past electric heating elements which have dried the ink prior to the time the parts were delivered to the container assembly machine. Difficulties were encountered because parts which were deposited end-up on the conveyor, sometimes tipped over, or were improperly deposited in the first place, and had to be manually removed in order to prevent jamming at the container assembly machinery.

One of the prime objects of the present invention is to design a self-clearing, interrupted-path conveyor system having a transfer element which moves only upright container parts to the container section leading to the container assembly machine, while permitting those parts which have fallen over to proceed off the upstream section of the container conveyor system to a disposal unit. In this way, jam-ups at the container assembly machine are averted, and the ink on those parts which are conveyed in upright disposition is always dry by the time the parts reach the container assembly machine. Those parts which have been improperly deposited on the conveyor system, or tipped over before the ink on them is dry, so that the ink is smudged, are delivered to a remote location for disposal and scrapping.

Another object of the invention is to provide a conveyor system of the character described which accepts container parts of varying height and diameter, with only a minor adjustment of the conveyor section connecting transfer disc mechanism in the former instance.

Still another object of the invention is to design a conveyor system which provides mechanism for turning conveyor parts being conveyed through a partial revolution to present undried areas of the container parts to the drying elements extending along the sides of the conveyor sections.

A further object of the invention is to provide a conveyor system of the character described which has mechanism for delivering container parts to the first drying conveyor section in proper upright disposition, without in any way contacting the printed peripheral walls thereof.

A final object of the invention is to provide relatively economic and practical mechanism for handling easily tipped-over, light-weight plastic container parts in a most reliable and efficient manner which permits the extremely high-speed processing of such parts in a production line which includes machinery for differential pressure forming container parts, printing the container parts, assembling and friction welding parts at a container assembly area, filling the assembled containers with product, and finally applying closures to the product-filled containers.

Briefly, the system includes a pair of drying conveyors connected by a horizontal transfer disc assembly, the light-weight plastic container parts being delivered to the first or receiving conveyor section by a vertical transfer disc assembly.

Other objects and advantages of the invention will be pointed out specifically or will become apparent from the following description when it is considered in conjunction with the appended claims and the accompanying drawings, in which:

Figure 2:
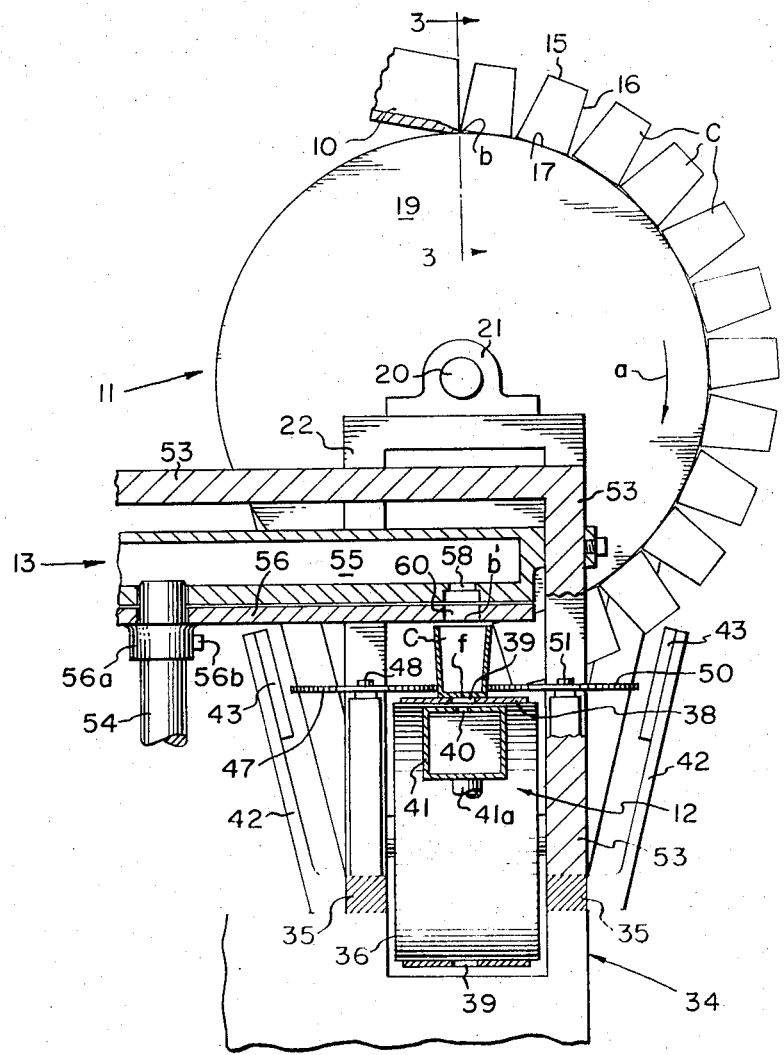
FIG. 2 is a transverse sectional view taken on the line 2—2 of FIG. 1, showing the rotary transfer disc assembly for transferring parts to the first drying conveyor section.

Referring now more particularly to the accompanying drawings, wherein I have disclosed only a preferred embodiment of the invention, container parts, generally designated C, are shown, particularly in FIG. 2, as being delivered from a supplying conveyor chute 10 to the container drying conveyor system which includes a vertical, transfer disc assembly, generally designated 11, an upstream or receiving drying conveyor section 12, a horizontal transfer disc assembly 13 and a downstream drying conveyor section 14.

The containers C each comprise a closed end wall 15 and an annular peripheral side wall 16, and are open-ended at their opposite ends 17. As FIG. 2 clearly indicates, they proceed down chute 10 with their open ends 17 down and during delivery to the conveyor section 12, via transfer disc assembly 11, are inverted so as to be deposited on the conveyor section 12, open-end-up. They proceed on the conveyor 12 past a part-turning mechanism, generally designated 18 in this disposition, and remain in this disposition during transfer by the transfer disc assembly 13 to the downstream or discharge conveyor section 14. A similar conveyor turn assembly 18' is provided along the downstream conveyor section 14.

THE VERTICAL TRANSFER WHEEL ASSEMBLY

Figure 3:
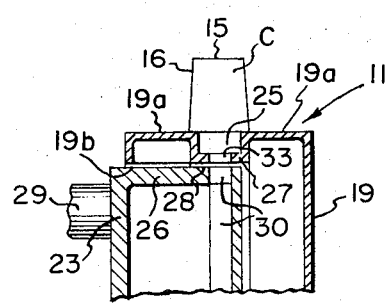
FIG. 3 is a sectional elevational view taken on the line 3—3 of FIG. 2.

FIGS. 2 and 3 particularly disclose a vertical transfer disc assembly for inverting the container parts C while delivering them to the upstream drying conveyor section 12. As these figures particularly indicate, the transfer wheel assembly 11 includes a rotary disc or wheel member 19, mounted to rotate on a drive shaft 20, supported by a bearing 21 provided on a support frame 22. The shaft 20 is driven by a suitable motor (not shown) through a conventional gear reduction mechanism (not shown) in the direction of the arrow $a$ in FIG. 2. It has part-supporting peripheral sections 19a which are axially spaced to provide what may be termed a suction groove 25 therebetween.

Mounted radially inward of the rotary disc 19 in an opening 19b, provided in the one end wall thereof, is a closed stationary disc housing, generally designated 23. The housing 23 includes an annular axially projecting wall portion 26 disposed radially inwardly of and in underlying relation with an axially extending, radially inset, annular wall portion 27, provided on rotary disc 19. Suitable clearance 28 is provided between the annular walls 27 and 26 so that the wall 26 in no manner interferes with the rotation of the disc 19. Extending into stationary disc 23 is a suction tube 29 which communicates with a vacuum source, such as a conventional vacuum pump. It will be seen that the pipe 29 communicates with a semi-annular slot 30 provided in wall 26. The slot 30, which extends angularly 180° from the point $b$ to the point $b'$ (FIG. 2) in stationary disc duct member 23, communicates with a series of closely spaced openings 33 provided in the annular wall 27 of rotary disc 19 and communicates a suction which is effectual to hold the container parts C on the periphery of rotary disc 19 while they are being conveyed around to and deposited on the conveyor section 12.

THE HEATER CONVEYOR SECTIONS

The conveyor section 12 is parallel with the conveyor section 14, but moves the conveyor parts C in a direction $d$ which is opposite to the direction $e$ in which the conveyor section 14 moves the container parts C. For the sake of convenience, only the conveyor 12 will be described in detail and it is to be understood that the conveyor 14 is identical and therefore, the identical parts thereof have been given the same numerals except for a "prime" designation.

The conveyor section 12 includes a supporting framework, generally designated 34, which includes spaced apart side rails 35 on which bearings 36 are provided, at both the front and rear ends, for journaling shafts 37 for pulleys or rolls 36a over which an endless belt 38 is trained. The shaft 37, at the upstream end of conveyor section 12, is preferably driven via a suitable gear reduction box and an electric motor (not shown), and it should be understood that the endless belt 38 of conveyor section 12, and 38' of conveyor section 14, are driven at the same linear rates of speed. The belts 38 are perforate and provided with centrally disposed, closely spaced openings 39, communicating with a slit 40 provided in a stationary suction duct 41 supported by the framework 34, in any suitable manner, between the pulleys 36. A suction tube 41a communicates the duct 41 with a suitable source of vacuum. The slit 40 extends from the place of deposit of the container parts C on the endless belt 38 at $f$ (which lies directly below point $b'$) and the point $g$ where each upright container part C is to be picked up by the transfer assembly 13, in a manner to be presently described.

Provided on the conveyor section 12, on brackets 42, are electric heating elements 43 which extend longitudinally along a substantial portion of the length of conveyor 12 to dry the ink printed on the side walls 16 of container parts C. Located generally intermediately on conveyor section 12, is the part-turning assembly 18 and it should be understood that the assembly 18' provided on conveyor section 14 is identical and therefore, the identical parts will have identical "prime" numerals.

Figure 1:
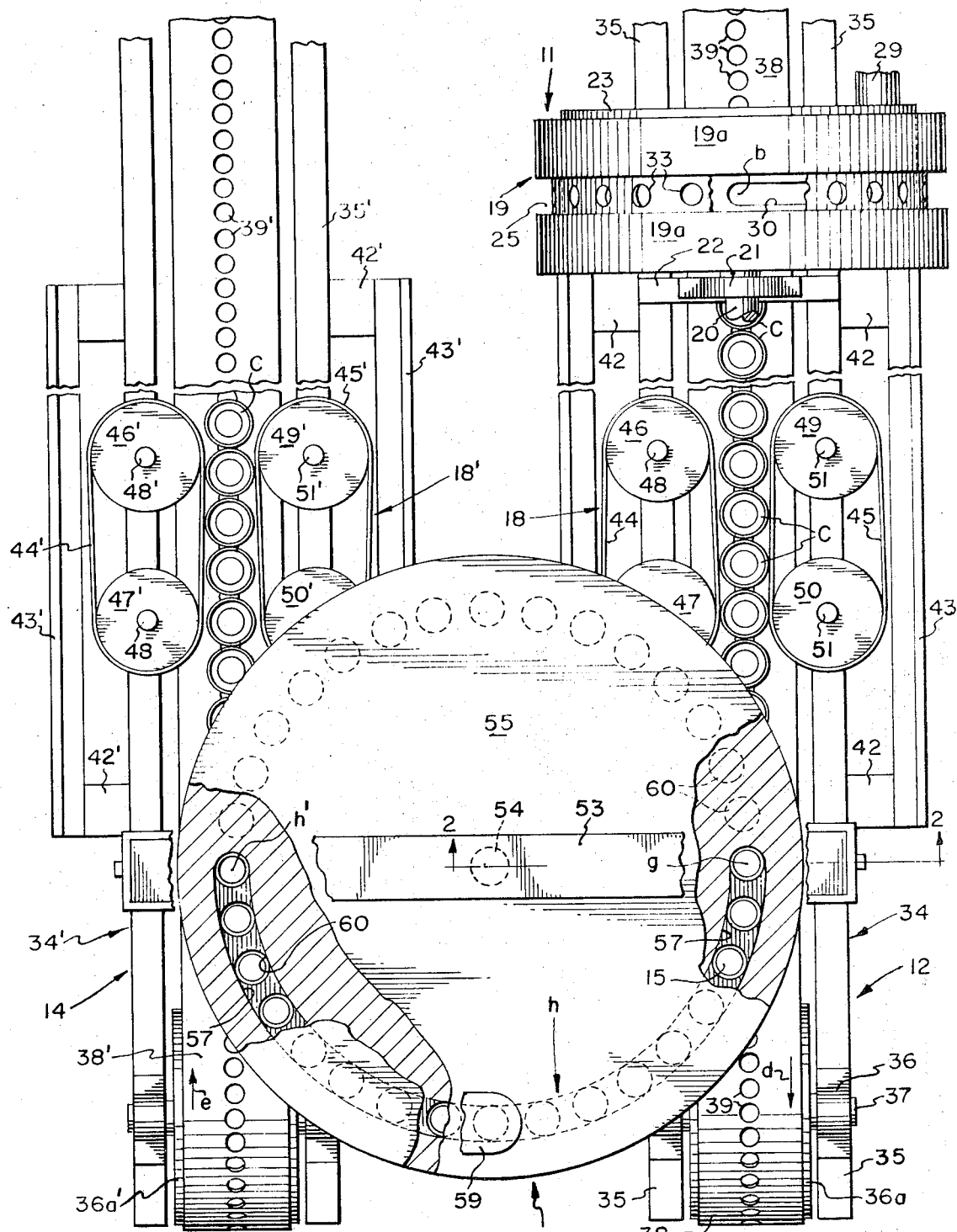
FIG. 1 is a top plan view of the apparatus showing container parts being transferred from one drying conveyor section to another by a rotary transfer disc assembly which is partly broken away to illustrate better the several parts thereof.

Describing only turning assembly 18, therefore, it will be seen that it comprises a pair of endless belts 44 and 45 which converge in a downstream direction. The conveyor belt 44, which as FIG. 2 indicates, is of sufficient width to engage only the extreme bottom portion of the peripheral wall 16 of each container C in an area which is unprinted, as does belt 45, is trained around a pair of pulleys or discs 46 and 47 mounted on shafts 48, it being evident in FIG. 1 that the pulley 47 is of slightly greater diameter than the pulley 46. Similarly, the belt 45 is trained around pulleys or discs 49 and 50, mounted on shafts 51, pulley 50 being of slightly greater diameter than pulley 49. The belts 44 and 45 are probably soft, flexible, friction drive belts, which at their downstream end are spaced apart just sufficiently to engage the peripheral wall 16 of a container part C without deforming it. The shafts 48 and 51 at one end may be driven by separate electric motors through separate gear reduction units, or by other drive systems such that the belt 44 is driven at a slightly greater speed, i.e., 15 percent higher, than the belt 45. This has the effect of turning each container part C encountered about a quarter turn (90 degrees) to expose undried areas to the heater elements 43. It is to be understood that the turn assembly 18' operates in exactly the same manner.

THE HORIZONTAL TRANSFER WHEEL ASSEMBLY

Mounted on the framework section 34 is an inversely U-shaped frame 53 which may suspend a fixed disc housing or duct 55 over a rotary disc 56 in a manner to provide for vertical adjustability of the duct 55. The latter disc 56 is keyed to a drive shaft 54, disc 56 having a dependent collar 56a which may be secured to drive shaft 54 by set screw members 56b, to provide for vertical adjustability of the member 56 with respect to shaft 54. The shaft 54 may be connected through suitable gear reduction equipment or the like to a motor for revolving disc 56 at a predetermined rate of speed. Preferably, although not necessarily, the same electric motor may be employed to drive the conveyor belts 38, 38', the belts 44 and 45, and the rotary transfer discs 19 and 56.

Provided in the stationary member 55 to extend angularly 180° therein, is a suction groove 57 which communicates via ports 58 with the hollow interior of member 55 and a suction tube 59. The groove 57 communicates with a series of closely spaced openings 60 provided around the periphery of rotary disc 56 in an area $h$ of the disc 56 spaced radially outwardly from the axis thereof. The shaft 54 is driven at a speed such that the linear speed of parts C being conveyed on disc 56 is substantially the same as the linear speed of parts C being conveyed on either of conveyor belts 38 and 38'.

THE OPERATION

In operation parts C are delivered to the vertical transfer disc assembly 11 by chute 10 and suction exerted at point $b$ via groove 25 and slot 33 is employed to hold the container parts C to the rotary disc 19 such that they are moved thereon around to the point $b'$ where, with suction terminating, they are released to the conveyor belt 38. At this point, suction exerted through duct slit 40 via suction pipe 41a and openings 39, upon the end walls 15 of the container parts C, holds the parts C in upright position and conveys them linearly along the conveyor section 12. As the container part C moves slowly along the container section 12, the wet ink, printed on their peripheral sides 17, is dried by heating elements 43.

After the parts C have moved a substantial distance, the conveyor assembly 18, via the differential speed of belts 44 and 45, partially revolves container parts C through a quarter turn so that new side areas 17 are presented to the upstream portions of electric heating elements 43. At point $g$, the considerably greater suction exerted via stationary disc duct 55, lifts the container parts C from the belt 38 in sequence as they arrive. Those parts which are not uprightly disposed are not lifted, and proceed off the end of the belt 38 to a suitable receptacle or the like. It will be observed that the rotary disc 56 is set at such a height that it revolves just above the open ends 17 of container parts C. The conveyor disc 56 moves the parts 180° and deposited them in sequence at the point $h'$ on conveyor section

38'. At point *h*, they are removed from the influence of suction forces exerted via duct 57 and are deposited gently in upright condition on the slowly moving belt 38'. Suction forces exerted through the openings 60' in belt 38' on the end walls 15 of container parts C, keep them in upright position as they pass for further drying past electric heating elements 43' to the assembly 18' which again turns them approximately 90°. Thereafter, the surfaces 17 are further dried by the heating elements 43' prior to the time that belt 38' discharges the container parts C to a container assembly machine.

The system is efficient and reliable, and is self-clearing in the sense that parts which tip over are removed and never get transferred by the horizontal transfer disc system 13 to the downstream conveyor section 14.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In container part suction conveyor mechanism and the like; a part supply conveyor; a part discharge conveyor located at a spaced distance therefrom; transfer conveyor means connecting said supply and discharge conveyors comprising adjacent relatively rotatable members, one of which comprises a rotatably mounted disc having a part conveying section; means for driving said rotatably mounted disc member in an endless path proximate said conveyors with said part conveying section moving at substantially the linear speed of travel of at least one of said supply and discharge conveyors; a vacuum source communicating with said other member; opening means in said other member for communicating said vacuum source and endlessly traveling rotary disc member during only a portion of its endless path of travel to apply a suction to pick up parts from the supply conveyor and release them to the discharge conveyor; said supply and discharge conveyors being horizontal and driven in generally opposite directions at the same level; said transfer conveying member comprising a pair of superposed discs, with the rotary one disposed below the stationary one, at a predetermined distance above the operative level of said supply and discharge conveyors; said supply and discharge conveyors being parallel; and heat-producing, print-drying elements extend alongside at least one of said conveyors at an operative level at the level of parts thereon.

2. A container part conveyor system comprising: a first longitudinally disposed horizontally oriented conveyor belt section; means for transferring lightweight plastic container parts of a generally cylindrical nature thereto in upright disposition; a second longitudinally disposed horizontally oriented conveyor belt section spaced laterally from said first section; transfer part gripper means having a part-engaging portion movable in a path of travel about a generally vertical axis for lifting only parts in upright disposition on said first conveyor belt section and transferring them over to said second conveyor belt section; and drying element means arranged to extend longitudinally along at least one of said conveyor sections at a level spaced above the conveyor section sufficiently to dry the side walls of container parts being conveyed therealong in upright disposition.

3. The combination defined in claim 2 in which part-turning mechanism is provided interjacent the ends of said drying element means and transversely between them in the path of said parts to successively turn said parts approximately 90° and expose undried areas of the sides thereof to the heater means; said turning means comprising a pair of spaced apart endless conveyor belts converging in a downstream direction to a gap approximately the diameter of a container part; said belts being located at a level above the conveyor section so as not to smudge ink on the part side walls; and means for driving said endless belts at slightly differing speeds to effect said turning action.

4. The combination defined in claim 3 in which said first and second conveyor sections comprise perforated belts with upper runs traveling over longitudinally extending suction duct means in alignment with the perforations in said belts; and said transfer means comprises a perforate turntable mounted for horizontal rotation and a stationary 180° suction duct opening in communication with the perforations therein to lift container parts on said first conveyor section and deposit them successively on said second conveyor section.

* * * * *